(12) United States Patent
Allan

(10) Patent No.: US 9,801,358 B1
(45) Date of Patent: Oct. 31, 2017

(54) METHOD AND APPARATUS FOR FIELD INCUBATION OF BEES

(71) Applicant: Pacific Pollination LLC, El Dorado, AR (US)

(72) Inventor: Matthew Allan, Eastleigh (GB)

(*) Notice: Subject to any disclaimer, the term of this patent is extended or adjusted under 35 U.S.C. 154(b) by 0 days.

(21) Appl. No.: 14/275,002

(22) Filed: May 12, 2014

Related U.S. Application Data

(60) Provisional application No. 61/822,854, filed on May 13, 2013.

(51) Int. Cl.
*A01K 47/06* (2006.01)

(52) U.S. Cl.
CPC .................................... *A01K 47/06* (2013.01)

(58) Field of Classification Search
CPC ................................. A01K 47/00; A01K 47/06
USPC ....................... 449/1, 2, 4, 12, 15, 26, 32, 34
See application file for complete search history.

(56) References Cited

U.S. PATENT DOCUMENTS

| | | | |
|---|---|---|---|
| 3,438,070 A | 4/1969 | Florance | |
| 3,994,034 A | 11/1976 | Van Damme et al. | |
| 4,241,467 A * | 12/1980 | Pannell | A01K 49/00 449/2 |
| 4,349,927 A * | 9/1982 | Adams, IV | A01K 47/00 449/32 |
| 4,455,699 A * | 6/1984 | Brown | A01K 47/06 449/19 |
| 4,483,031 A * | 11/1984 | Shaparew | A01K 47/06 449/14 |
| 4,494,528 A * | 1/1985 | Horton | A01K 47/06 126/627 |
| 5,741,170 A * | 4/1998 | Orletsky | A01K 47/00 449/30 |
| 5,895,310 A | 4/1999 | Otomo et al. | |
| 6,364,738 B1 | 4/2002 | Kendell et al. | |
| 6,475,061 B1 * | 11/2002 | Huang | A01K 47/04 449/1 |
| 7,086,924 B2 | 8/2006 | Mills | |
| 7,556,552 B1 | 7/2009 | Kemp et al. | |
| 8,465,340 B1 * | 6/2013 | Allan | A01K 47/00 449/26 |
| 8,517,793 B2 | 8/2013 | Weeden | |
| 8,602,837 B1 | 12/2013 | Allan | |
| 2007/0218804 A1 | 9/2007 | Allan et al. | |

* cited by examiner

*Primary Examiner* — Lisa Tsang
(74) *Attorney, Agent, or Firm* — James M. Duncan, Esq.; Klein DeNatale Goldrier

(57) ABSTRACT

A hivetop incubator stimulates dormant solitary bees to emerge at the appropriate time to pollinate orchard and field crops. The hivetop incubator utilizes the heat produced by a colony of honeybees. It comprises an insulated incubation chamber with a lid and a screened base. The hivetop incubator is placed over the open top of a beehive containing a honeybee colony. Heat generated by nurse honeybees to maintain temperatures within the brood nest rises into the incubation chamber. Dormant solitary bees in cocoons are placed within the incubation chamber and are stimulated by the warmth to emerge rapidly. The active bees leave the incubation chamber thru exits and are thus available in the orchard or field for pollination.

2 Claims, 4 Drawing Sheets

METHOD AND APPARATUS FOR FIELD INCUBATION OF BEES

RELATED APPLICATIONS

U.S. Application No. 61/822,854 for this invention was filed on May 13, 2013, for which application this inventor claims domestic priority.

BACKGROUND OF THE INVENTION

Pollination is essential for many of the fruits and nuts in our diet, and for the production of seed for growing vegetables, salad crops, fiber crops, herbs, etc. as described in McGregor S E 1976, "Insect Pollination of Cultivated Crop Plants", United States Department of Agriculture. The great majority of managed pollination is carried out using honeybees, while bumblebees are used under glass and in tunnels or hoop houses. However, there are advantages in using solitary bees, such as alfalfa leafcutter bees, as managed pollinators. Solitary bees suitable for this purpose, mostly species of *Megachile* and *Osmia*, are present in many parts of the world and thus represent a very substantial agricultural asset. Management of solitary bees as pollinators, however, requires significantly different techniques. For example, solitary bees spend a considerable portion of their life in a dormant phase known as diapause, either as mature adults or as larvae, prepupae or pupae.

It is of great importance that the active period of the bees coincides or overlaps with the bloom period in order to achieve optimal pollination and hence a heavy crop of good quality produce. In order to do this, the bees need to be stimulated to emerge from diapause. This is normally done by increasing the temperature in which the bees are held. By relating historical data on emergence of bees in response to heating with historical data on rate of development of flowers in the target crop, the period and temperature of incubation can be selected so that a desired proportion of the bees have emerged by start of bloom.

This process is straightforward to carry out in a laboratory or a commercial facility. Following incubation and emergence the bees may be transported to the field or orchard and released. However, there are biological advantages to carrying out the incubation in situ, so that newly emerged bees may immediately fly into the target crop. Field incubators powered by batteries, mains electricity, propane/butane/diesel or other fuel burners, and renewable energy sources are known in the industry. Unfortunately, the known field incubation equipment may be complex, heavy, expensive and easily damaged. The use of a biological source of heat energy, i.e. the heat produced by another organism (in this case a colony of honeybees) is unreported in the literature and unknown in the prior art. By this means the field incubation equipment can be made simple, lightweight, cheap and robust. In addition, the fact that a honeybee colony precisely regulates temperature and humidity in the brood nest means that the temperature within the claimed hivetop incubator is predictable and reliable.

SUMMARY OF THE INVENTION

Embodiments of the present invention provide a solution to the problems identified above, namely an apparatus and method for incubating solitary bees. The apparatus is relatively simple and inexpensive. Instead of relying on the power sources mentioned above, embodiments of the disclosed apparatus utilize the heat energy generated by another family of insects, honeybees, which are not predators or otherwise harmful to solitary bees. Honeybees live in colonies which are extremely good at thermoregulation. The young of honeybees can only thrive and develop within a closely limited range of temperature and humidity. The honeybee colony controls the temperature by adjusting the size and density of a cluster of hive bees.

Embodiments of the disclosed incubator comprise an incubation chamber in which cocoons of dormant solitary bees are disposed. The incubation chamber is disposed such that its base is in facing contact with the top surface of the honey bee hive. Honey bee hives typically contain a plurality of wooden frames which hang inside the interior of the hive, where the wooden frames hold the comb. Wooden frames for holding the comb, hang inside the body of a hive. The incubation chamber is placed on top of a honeybee hive after the roof and other covers are removed from the honey bee hive. The incubation chamber has a screened base which (a) keeps the honeybees and the emerged solitary bees from coming into contact, and (b) allows the heat from the honeybee cluster to rise and warm the solitary bee cocoons, thereby stimulating emergence. By constructing the upper chamber claimed to include insulating materials, the temperature in the incubation chamber may be sustained at the required level to promote emergence of the solitary bees. The incubator is therefore inexpensive, simple and reliable.

As the solitary bees emerge, biting their way out of their cocoons, they are attracted by the light coming through the escape opening(s) or exits, from whence they can fly into the target crop. It should be noted that there is very little interaction between the different species of bees, certainly no conflict and almost indifference to the presence of the different species.

There are synergistic benefits to having two different types of bee pollinating a crop in an orchard or field. It is believed that honey bees are very efficient in transporting pollen within specific trees or plants. However, the solitary bees are very efficient in distributing pollen to a large number of different trees or plants. Thus, for example, solitary bees may be very efficient in achieving pollen distribution within trees within an orchard, while the honey bees are very efficient in redistributing pollen within a particular tree, in which the pollen was originally deposited by solitary bees. These synergistic benefits provide the opportunity for an efficient, affective and profitable commercial pollination operation.

DETAILED DESCRIPTION OF THE EMBODIMENTS

The present inventor has conceived a method and apparatus for incubating solitary bees of the genus *Osmia* or *Megachile* so that dormant bees are stimulated to emerge in an orchard or field to pollinate a crop in which honeybees are also deployed for pollination purposes. The current invention provides an incubation chamber which is disposed directly over a colony of honeybees in a conventional beehive, in order that the solitary bee cocoons contained in the incubation chamber are warmed by the heat generated by the honeybees, and stimulated to emerge from diapause. The current invention is particularly useful, but not exclusively intended for, commercial pollination of almonds, apples, cherries, pears and other tree fruit, and seed crops.

Embodiments of the invention comprise an incubation chamber in which cocoons of dormant solitary bees are disposed. Because the incubation chamber will be placed on top of a beehive which is utilized for commercial pollination, and will be exposed to the inevitable rough handling which these hives are exposed to, it may be advantageous to construct the parts of the hivetop incubator in the same robust manner as commercial beehives, i.e. of similar grade timber with appropriately glued and nailed or screwed joints. Other alternative materials, such as high-density foamed polystyrene or molded plastic or molded timber/resin composites are becoming known in the beekeeping industry and are satisfactory alternatives to conventional timber manufacture. The following description refers to a hivetop incubator constructed using conventional beekeeping technology.

Figure 1:
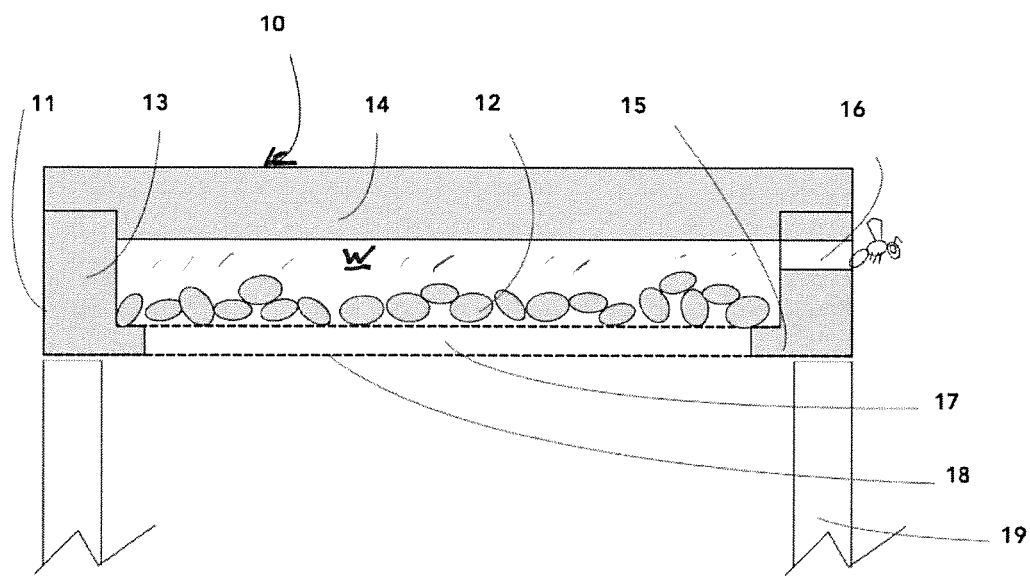
FIG. 1 shows a cross-section of an embodiment of a hivetop incubator in place over a honeybee hive.

Referring to FIG. 1, embodiments of the hivetop incubator 10 comprise the incubation chamber 11 comprising enclosing walls which may comprise two end walls W, and two side walls 13 jointed to form a rectangular frame of the same plan dimensions as the hive 19 on to which the hivetop incubator will be placed. Beehives around the world are built in many different sizes. Even in the USA where the Langstroth hive has been almost universally adopted, there are nevertheless several variations in dimensions. For example, hive bodies containing ten frames are the most common, but narrower boxes containing eight frames (and correspondingly narrower) are often used for migratory beekeeping and pollination services. Specific dimensions will therefore not be given here, as the constructor will make the hivetop incubator to suit the hives on which it will be located. Likewise, while hives typically have rectangular shape, the utilization of non-rectangular shaped-hives is not precluded, the only requirement being that the base of the incubator match the opening in the top of the hive to allow for alignment of the base and the opening in the top to provide for sufficient thermal transport between the hive 19 and the incubation chamber 11.

On the underside of the rectangular frame of the hivetop incubator 10 are fitted one or more screens 18 of metal or plastic mesh. Embodiments of the hivetop incubator 10 may comprise two parallel semi-rigid or rigid screens 18 to prevent honeybees in the hive 19 below the hivetop incubator 10 from being able to touch solitary bees which have emerged from cocoons 12 in incubator chamber 11. It is known for honeybees to bite the tarsi (feet) of bees walking on the other side of a screen. The tarsi of bees contain important sensory organs of taste and smell. By providing a pair of screens 18 with an intervening gap 17, which typically will be defined by screens 18 have a separation of 6 mm to 10 mm, there is little risk of the tarsi of solitary bees in incubator chamber 11 being harmed by honeybees in hive 19 below.

Screens 18 may be attached to the underside of the hivetop incubator by nailing, screwing, glueing or otherwise fixing. A batten or spacing element 15 may be disposed in intervening gap 17 to provide the desired separation. Other methods of fixing the screens and maintaining the separation between the screens 18 may be utilized by practitioners of the art.

Incubator chamber 11 includes one or more escape passages 16 through side and/or end walls 13 which allow free passage of adult bees from the interior to the exterior. Escape passages 16 may be drilled holes or other formed passages. Escape passages 16 are typically larger than 8 mm diameter or equivalent cross-sectional area, in order to prevent roosting bees from blocking the exit in cool weather, and less than 25 mm diameter or equivalent cross-sectional area in order to limit heat loss by flow of warm air to the exterior. The inventor herein has found that escape passages 16 from 20 mm diameter bored holes accomplish the goals of preventing blockage of the exit and limiting heat loss.

A removable cover 14 is provided to cover incubation chamber 11. This may be a simple board or be configured to form a positively locking engagement with incubation chamber 11. End walls W and side walls 13 and cover 14 may be advantageously fitted with a layer of thermally insulating material (not shown) or alternatively be constructed of thermally insulating material in order to maintain the air temperature within incubation chamber 11 at a high temperature when in position over hive 19. When in use, hivetop incubator 10 is placed directly above hive body 19 after first removing the hive roof and/or cover board, so that there is no obstruction apart from screens 18 preventing circulation of warm air from hive body 19 upwardly into the hivetop incubator 10.

Hive body 19 naturally generates heat. Hive bodies 19 provided to growers for pollination will contain a substantial population of honeybees. Each hive delivered to an orchard or grower for pollination purposes is required to contain brood, i.e. immature bees in comb. Brood normally comprises prepupae and pupae in sealed cells, and eggs and larvae in open cells. To ensure that young bees are healthy and viable, the nurse bees in the hive maintain the area around the brood at 35 degrees Celsius, regardless of exterior ambient conditions. The humidity is also maintained at a high level by nurse bees to prevent immature bees in the comb from drying out.

The warm air of the honeybee brood nest rises and cause heat transfer into the interior of hivetop incubator 10. However, because honeybees build extensions to the comb at the top of the brood area to reduce heat loss, heat transfer into the hivetop incubator will be impacted by this natural insulation and from the heat losses from air leakage and conduction will result in a temperature in hivetop incubator 10 which is in an approximate range of 25 degrees Celsius to 30 degrees Celsius, as compared to the brood temperature of approximately 35 degrees Celsius. Fortunately, this temperature range is close to ideal for stimulating *Osmia* and *Megachile* bees to emerge from diapause and bite their way out of cocoons. Commercial operators commonly incubate at 26 degrees Celsius to 28 degrees Celsius.

The hive roof and/or cover board may be conveniently placed on top of hivetop incubator 10 for eventual replacement on hive 19. When carrying out the placement, inspection and removal of hivetop incubator 10, the operator should adopt conventional beekeeping practice, i.e. wear protective clothing, particularly a veil; have a smoker lit and ready for use; and be aware of dangers involved in working honeybees. The operator should select strong colonies of honeybees on which to place hivetop incubators 10, either by flight activity at the entrance or by visual examination of frame tops to assess the number of bees and frames of brood.

Cocoons 12 of solitary bees may be placed in incubation chamber 11 either before hivetop incubator 10 is placed on hive 19, or subsequently. If subsequently, the operator should transport cocoons 12 in a container, lift lid 14, deposit cocoons 12 on screen 18, and replace lid 14. Cocoons 12 should preferably be spread into an even layer.

Upon emergence, adult solitary bees are attracted to the light, and will walk through escape passages 16 to the exterior. It is essential to the success of the current invention that interactions between the solitary bees and the honeybees are not harmful or detrimental to either; in practice there is minimal interaction, and no observed hostility. Typically an emerged solitary bee walks thru the exit, positions itself in the sun to warm its thoracic muscles, then flies into the orchard or field. The solitary bees do not attempt to approach the hive entrance, where guard bees would attack them.

The present invention includes a method of stimulating solitary bees to emerge from diapause. An embodiment of the method comprises placing cocoons 12 in a hivetop incubator 10 and placing incubator chamber 10 over honeybee hive 19 so that the solitary bee cocoons are warmed by the heat generated by the honeybees.

In another embodiment of the method, the operator carries out trial incubations in advance of pollination by placing a sample of cocoons from the population of bees to be used for pollination in an electric incubator, in order to determine the rate at which bees emerge. It is known that different populations of bees vary widely in their responses to incubation, and that different storage regimes influence emergence behavior. The experienced practitioner does not make the assumption that response to incubation does not vary from year to year. The incubator operating temperature is set to a mean temperature or fluctuating temperature regime which approximates to temperatures recorded within hivetop incubators over a number of years. With this information, the operator can make a decision on when to remove the cocoons from storage and place them within the hivetop incubators in order to synchronize emergence of bees with flowering of the target crop. For example, an operational target may be to have 95% of the male solitary bees and 50% of the female solitary bees emerged and active by the time the target crop is in 20% bloom. Knowledge of bee emergence times and development of flowers from dormant bud to full bloom gives the operator an indication of when to deploy the cocoons.

In another embodiment of the method, the operator may choose to reduce the time the cocoons are in the hivetop incubator by pre-incubating the cocoons. For example, if the above test incubation procedures indicate a period of say eleven days until the bees are at the desired state of emergence, the operator may choose to place the cocoons in an electric incubator at a central facility for say six days before placing them in hivetop incubators. This provides some additional flexibility in the pollination operation in that the operator may increase or decrease the incubator temperature and hence rate of emergence, should weather conditions or rate of flower opening require it.

In a further embodiment of the method, the operator may choose to process the male and female cocoons separately. Normally the males emerge substantially in advance of the females. It may be advantageous to have males and females emerge more closely together, in which case the female cocoons may receive, for example, a few days more incubation than the males.

The operator may choose to place the hivetop incubators in their selected locations before placing the cocoons inside; alternatively, the operator may decide to place the cocoons into the hivetop incubators prior to transporting the hivetop incubators to the field or orchard.

The number of cocoons to be placed inside each hivetop incubator is a function of the size of the hivetop incubator which in turn depends on the size of hive on which the hivetop incubator is to be placed. In a hivetop incubator based on an eight-frame Langstroth hive, fewer than 3,200 female cocoons should be placed plus the associated number of males. A hivetop incubator sized to fit on a ten-frame Langstroth hive will be able to hold proportionately more.

The number of female solitary bees to pollinate a particular crop is for the commercial operator to determine. When solitary bees *Osmia lignaria* are used to pollinate almonds in California in conjunction with honeybees, a figure of 400 females per acre or 1,000 females per hectare may be considered sufficient. At this stocking rate, a hivetop incubator on an eight-frame Langstroth hive would hold sufficient solitary bees to pollinate eight acres or 3 Ha.

In a typical almond orchard of 160 acres, beehives are commonly placed in 12 evenly-spaced locations or bee drops in the beeways. When pollinating as described above, each bee drop would have typically between 12 and 16 beehives, usually on pallets each holding four beehives. In this example, therefore, the operator may decide to use two hivetop incubators at each bee drop, and place approximately 2,670 females plus associated males in each hivetop incubator. The bees are preferably measured by weight. Since the weight of cocoons diminishes with time, a counted sample should first be weighed to determine the mean weight on that particular day.

When selecting hives on which to place hivetop incubators, the strongest colonies should be selected. This can be assessed either by observing the flight activity at the entrance of the hive, or by removing the lid and/or cover board and looking at the number of bees and frames of brood inside the hive.

As a good operating practice, the hivetop incubators should be placed on top of the beehives so that the exits are not directly above the beehive entrances, in order to limit the possibility of solitary bees wandering inadvertently into the beehives where there is a risk the solitary bees will be attacked by guard bees.

A temperature datalogger may be disposed within one or more of the hivetop incubators to accumulate data on the relationship between strength of bee colony, ambient conditions and temperature rise in the hivetop incubator in order to guide future management practice.

Figure 2:
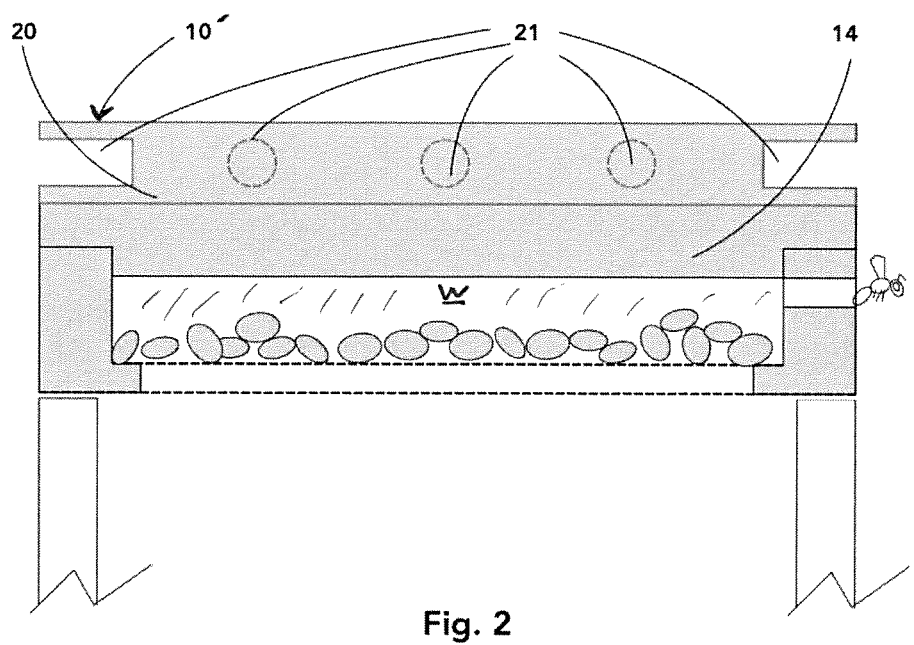
FIG. 2 shows a cross-section of an embodiment of a hivetop incubator which comprises roosting cavities.

In a further embodiment, the hivetop incubator 10' may incorporate roosting cavities 21. In the first two or three days following emergence, *Osmia* bees cluster together at night and in cold weather, particularly the males. FIG. 2 shows one option in which a wooden block having roosting cavities 21, which may comprise 20 mm diameter holes drilled into the block, is fixed to or otherwise supported by the cover 14.

Figure 3:
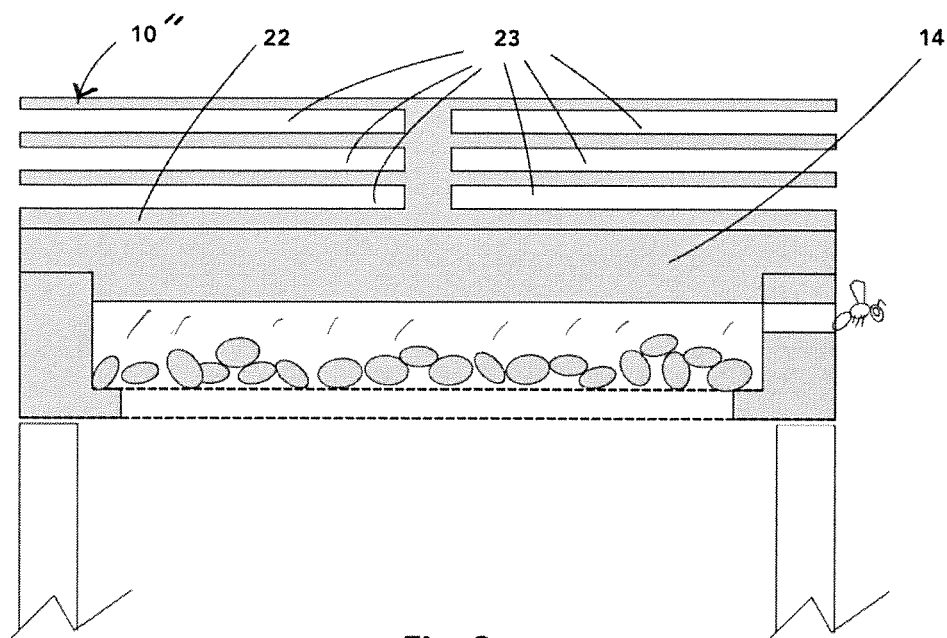
FIG. 3 shows a cross-section of an embodiment of a hivetop incubator which comprises nest cavities.

In a further embodiment, the hivetop incubator 10" may advantageously incorporate nesting cavities 23. FIG. 3 shows an optional arrangement in which nest elements, i.e., nesting cavities 23, are incorporated into or otherwise supported by the cover 14.

Figure 4:
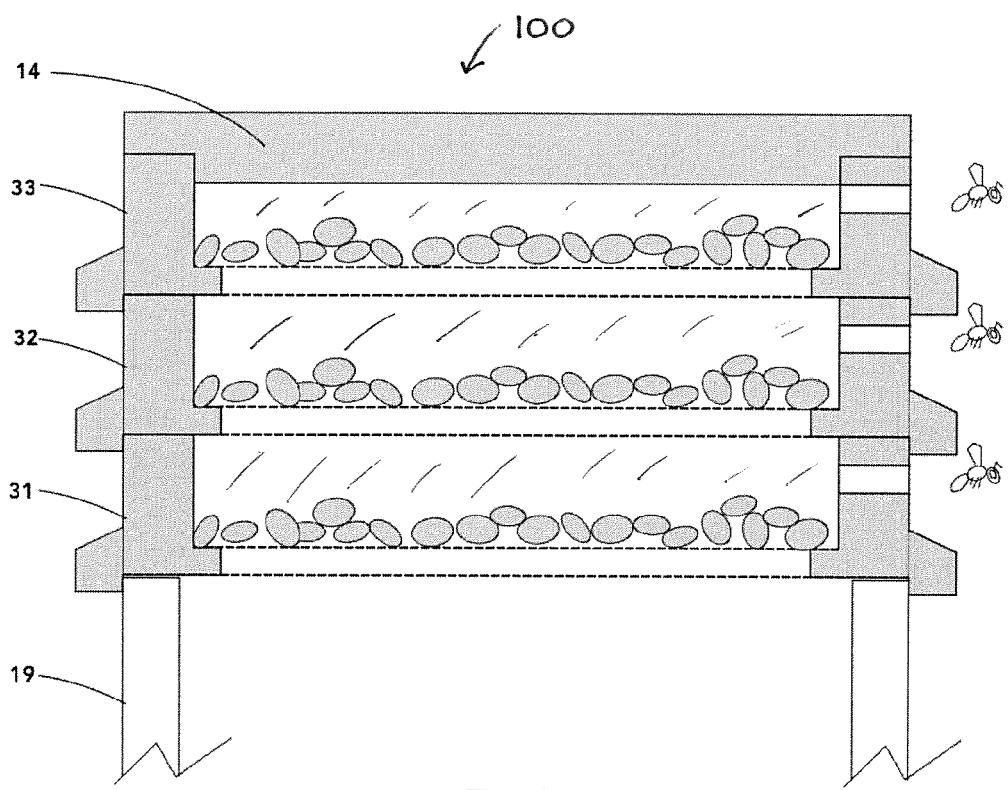
FIG. 4 shows a cross section of an embodiment of a hivetop incubator comprising multiple incubator chambers stacked one on top of the other over a honeybee hive.

In a further embodiment, the hivetop incubator 100 may comprise multiple chambers, each separated by screens 18. FIG. 4 shows one such arrangement.

While the above is a description of various embodiments of the present invention, further modifications may be employed without departing from the spirit and scope of the present invention. Thus the scope of the invention should not be limited according to these factors, but according to the following appended claims.

What is claimed is:

1. A method of stimulating solitary bees of the genus *Osmia* to emerge from diapause, the method comprising:
   placing a plurality of cocoons containing dormant solitary bees of the genus *Osmia* within a chamber, said chamber comprising an enclosing wall, a lid, a base, and at least one exit, wherein said base comprises an opening and a screen extending over said opening, said screen sized to prevent passage of said solitary bees; and
   positioning the base in facing relationship with an open top of a beehive in which at least one colony of honeybees is maintained, wherein the chamber receives heat generated by a metabolic activity of the at least one colony of honeybees to stimulate the solitary bees.

2. The method of claim 1 wherein the plurality of cocoons have been pre-incubated prior to placement in the chamber.

* * * * *